US010812623B2

(12) United States Patent
Richter et al.

(10) Patent No.: US 10,812,623 B2
(45) Date of Patent: Oct. 20, 2020

(54) HIERARCHICAL MESSAGE HANDLER (71) Applicant: SAP SE, Walldorf (DE)

(72) Inventors: Matthias Richter, Sinsheim (DE); Eva Angelina Hase, St. Leon-Rot (DE); Gabriela Bellemann de Leon, St. Leon-Rot (DE); Mathias Schoenecker, Hambrücken (DE); Gisella Dominguez Anzuinelli, Sankt Leon-Rot (DE); Nicolai Michaelis, Heidelberg (DE); Michael Rosier, Menden (DE); Gunilla Carbol, Leopoldshafen (DE); Frank Schuhmacher, St. Leon-Rot (DE); Lorenz Pfeil, Bruchsal (DE)

(73) Assignee: SAP SE, Walldorf (DE)

( * ) Notice: Subject to any disclaimer, the term of this patent is extended or adjusted under 35 U.S.C. 154(b) by 484 days.

(21) Appl. No.: 15/271,616

(22) Filed: Sep. 21, 2016

(65) Prior Publication Data
US 2018/0084046 A1 Mar. 22, 2018

(51) Int. Cl.
G06F 15/167 (2006.01)
H04L 29/08 (2006.01)
G06F 16/27 (2019.01)
H04L 12/26 (2006.01)
G06F 9/54 (2006.01)

(52) U.S. Cl.
CPC ............ *H04L 67/34* (2013.01); *G06F 9/546* (2013.01); *G06F 16/27* (2019.01); *H04L 43/04* (2013.01); *H04L 67/06* (2013.01)

(58) Field of Classification Search
CPC ......... H04L 67/34; H04L 43/04; H04L 67/06; G06F 17/30283; G06F 9/54
See application file for complete search history.

(56) References Cited

U.S. PATENT DOCUMENTS

| 5,832,496 | A | * | 11/1998 | Anand | G06F 16/248 |
| 2006/0218238 | A1 | * | 9/2006 | Critchley | H04L 51/30 709/207 |
| 2007/0250839 | A1 | * | 10/2007 | Van Der Sanden | G06F 9/54 719/315 |
| 2007/0282951 | A1 | * | 12/2007 | Selimis | H04L 67/06 709/205 |
| 2009/0089785 | A1 | * | 4/2009 | Marwinski | G06F 9/465 718/102 |
| 2011/0106858 | A1 | * | 5/2011 | Rieger | G06Q 10/107 707/805 |

* cited by examiner

*Primary Examiner* — Suraj M Joshi
*Assistant Examiner* — Jaren Means
(74) *Attorney, Agent, or Firm* — Buckley, Maschoff & Talwalkar LLC (57) ABSTRACT A system includes invoking, from a first application, a first method of a first interface to instantiate a first instance of a message handler class, the first instance of the message handler class associated with a first message buffer, providing, from the first application, a second interface and a handler to the first instance of the message handler class to a second application, and invoking, from the second application, a second method of the second interface to add a first message to the first message buffer associated with the first instance of the message handler class.

20 Claims, 8 Drawing Sheets

| Detail Message Table | | | |
|---|---|---|---|
| Detail Message Content | Hierarchy Level | Internal Identifier | Parent Identifier |
| Detail Message Content | Hierarchy Level | Internal Identifier | Parent Identifier |
| Detail Message Content | Hierarchy Level | Internal Identifier | Parent Identifier |
| Detail Message Content | Hierarchy Level | Internal Identifier | Parent Identifier |

HIERARCHICAL MESSAGE HANDLER

BACKGROUND

Enterprise software systems execute software applications to support many enterprise operations. During such execution, these systems receive, generate and store vast amounts of data. Some of this data includes messages generated by software applications, which may be acted upon and/or stored as appropriate.

The generated messages may include error messages, status messages and the like. Generated messages are often interrelated, such as a first message indicating an error and a second message describing details of the error. Systems are desired to facilitate creation and handling of interrelated messages, including the persisting of such messages in various external systems.

DETAILED DESCRIPTION

The following description is provided to enable any person in the art to make and use the described embodiments. Various modifications, however, will remain readily apparent to those in the art.

Figure 1:
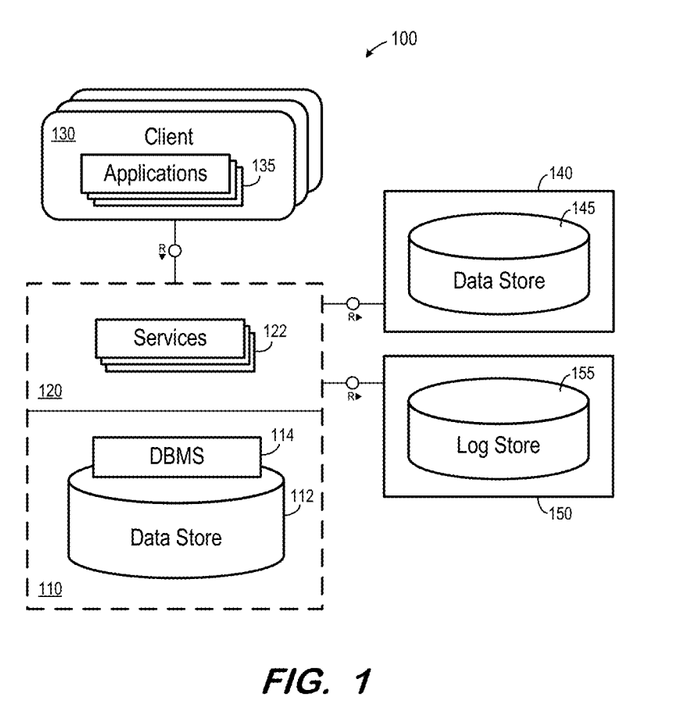
FIG. 1 is a block diagram of a system architecture according to some embodiments.

FIG. 1 is a block diagram of architecture 100 according to some embodiments. Embodiments are not limited to architecture 100 or to a database architecture. Architecture 100 includes database 110, server 120, clients 130, snapshot database 140 and log database 150.

Server 120 may execute and provide services 122 to applications 135. Services 122 may comprise server-side executable program code (e.g., compiled code, scripts, etc.) which provide functionality to applications 135 by providing user interfaces to clients 130, receiving requests from applications 135, retrieving data from data store 112 based on the requests, processing the data received from data store 112, and providing the processed data to applications 135.

Services 122 may be made available for execution by server 130 via registration and/or other procedures which are known in the art.

Services 122 may include services to export data of data store 112 to snapshot database 140 for storage in data store 145. Such services may comprise applications which generate log messages for storage in log database 150. The generated log messages may, for example, indicate and describe an error in the export of data of data store 112. Handling of messages according to some embodiments will be described in detail below.

According to some embodiments, database 110 includes metadata defining objects. An object is a collection of data related to a type of logical entity such as, for example, an employee or an organization. Each object associates one or more physical entities (e.g., associated columns of one or more database tables) with attributes (e.g., Address, Name) of its logical entity. Each instance of an object (e.g., an Employee or Organization object) consists of data of a specific logical entity (e.g., a specific employee or a specific organization).

The metadata may be stored in data store 112 and/or a separate repository (not shown). Data store 112 stores instance data for the objects defined by the metadata. For example, the metadata may define an Employee object and data store 112 may store individual employee data in database tables based on the Employee object.

Database 110 may support time-dependent instance data, in which some attributes of some objects may be associated with one or more validity periods. According to some embodiments, snapshot database 140, which includes data store 145, does not support time-dependent data. For example, the values stored within snapshot database 140 for each attribute of an object instance are either not time-associated or are all associated with a single time. Snapshot database 140 may be intended to store a "snapshot" of the currently-valid data of data store 112.

Each of data stores 112 and 145 may comprise a relational database, a multi-dimensional database, an eXtendable Markup Language (XML) document, or any other data storage system storing structured and/or unstructured data. The data of data stores 112 and/or 145 may be distributed among several relational databases, dimensional databases, and/or other data sources. In some embodiments, the data of data store 112 and/or data store 145 may comprise one or more of conventional tabular data, row-based data, column-based data, and object-based data. Moreover, the data may be indexed and/or selectively replicated in an index to allow fast searching and retrieval thereof.

Database 110 and/or database 140 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Server 120 provides any suitable protocol interfaces through which applications 135 executing on clients 130 may communicate with services 122 executing on application server 120. For example, server 120 may include a HyperText Transfer Protocol (HTTP) interface supporting a transient request/response protocol over Transmission Control Protocol (TCP), and/or a WebSocket interface supporting non-transient full-duplex communications between server 120 and any clients 130 which implement the Web-Socket protocol over a single TCP connection.

One or more services 122 executing on server 120 may communicate with DBMS 114 using database management interfaces such as, but not limited to, Open Database Connectivity (ODBC) and Java Database Connectivity (JDBC) interfaces. These types of services 122 may use Structured Query Language (SQL) to manage and query data stored in data store 112.

DBMS 114 serves requests to query, retrieve, create, modify (update), and/or delete data of data store 112. In this regard, database 110 may comprise any query-responsive data source or sources that are or become known, including but not limited to a structured-query language (SQL) relational database management system. DBMS 114 also performs administrative and management functions, such as but not limited to snapshot and backup management, indexing, optimization, garbage collection, and/or any other database functions that are or become known. DBMS 114 may also provide application logic, such as database procedures and/or calculations, according to some embodiments. This application logic may comprise scripts, functional libraries and/or compiled program code.

As illustrated, server 120 may be separated from or closely integrated with database 110. A closely-integrated server 120 may enable execution of services 122 completely on the database platform, without the need for an additional server. For example, according to some embodiments, server 120 provides a comprehensive set of embedded services which provide end-to-end support for Web-based applications. The services may include a lightweight web server, configurable support for Open Data Protocol, server-side JavaScript execution and access to SQL and SQLScript.

Each of clients 130 may comprise one or more devices executing program code of an application 135 for presenting user interfaces to allow interaction with server 120. The user interfaces of applications 135 may comprise user interfaces suited for reporting, data analysis, and/or any other functions based on the data of data store 112.

Presentation of a user interface as described herein may comprise any degree or type of rendering, depending on the type of user interface code generated by server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one of more of clients 130 execute applications 135 loaded from server 120, that receive data and metadata by requests to services 122 executed on the server 120. Data and metadata is processed by the applications 135 to render the user interface on the client 130.

Figure 2:
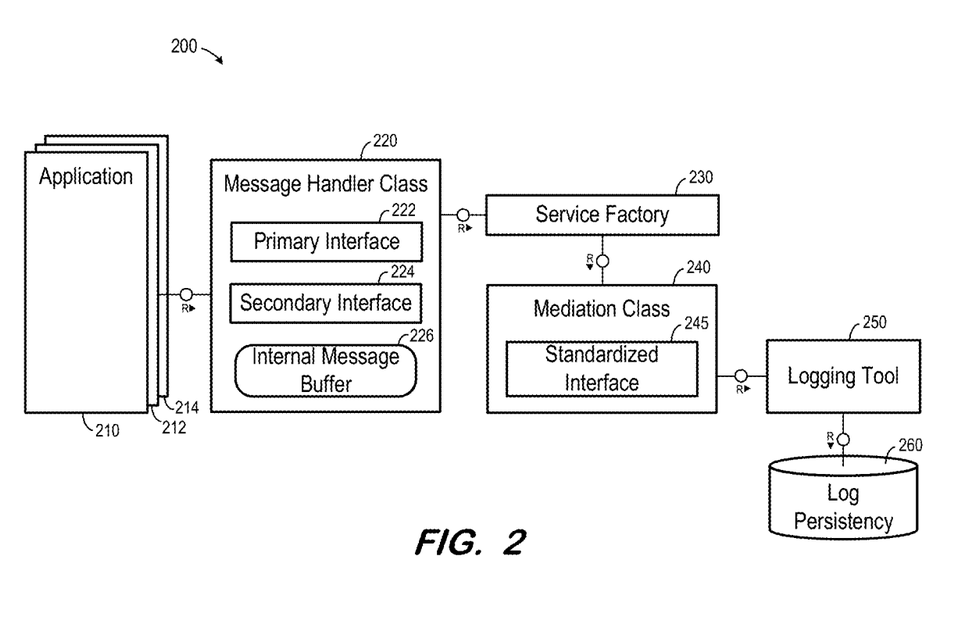
FIG. 2 is a block diagram of a system architecture according to some embodiments.

FIG. 2 is a block diagram of architecture 200 according to some embodiments. One or more elements of architecture 200 may be implemented within server 120 in some embodiments. For example, elements 210 through 245 may be implemented within server 120 and elements 250 and 260 may be implemented by log database 150.

Applications 210-214 may comprise server applications according to some embodiments. For example, application 210 may be executed to replicate data stored in data store 102 into data store 145, and application 212 may be executed to import data from data store 145 into data store 102. Application 214 may provide error handling for errors arising during replication or import.

Message handler class 220 provides primary interface 222 to allow addition of messages to internal instance-specific message buffer 226, reception of a list of buffered messages, etc. As will be described below, primary interface 222 and internal message buffer 226 support the generation and storage of hierarchical messages. Message handler class 220 also includes restricted secondary interface 224 which may be provided by a main application to secondary consumers (e.g., error handling application 214) and used thereby as described below.

According to some embodiments, secondary interface 224 provides the following methods:

| Method | Description |
| --- | --- |
| ADD_MESSAGE | Adds a new message to the message buffer of the message handler class instance |
| DISPLAY_LOG | Triggers display of buffered messages |
| CLEAR_MESSAGES | Clears message buffer |
| GET_MESSAGES | Returns all messages stored in buffer |
| GET_MESSAGE_SEVERITY_INFO | Returns number of buffered messages of each severity type |
| TAKEOVER_MESSAGES | Takes over message buffered by other message handler instance into the current instance |

Figure 3:
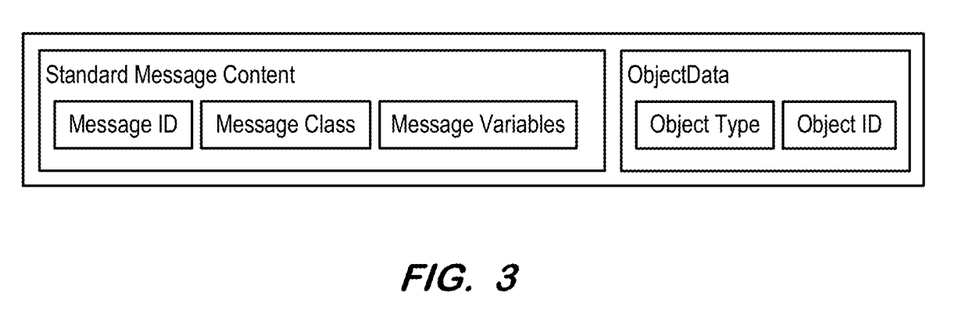
FIG. 3 is a representation of a message according to some embodiments.
Figure 4:
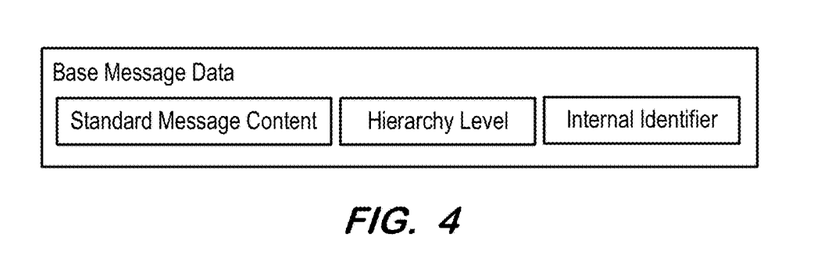
FIG. 4 is a representation of a stored base message according to some embodiments.
Figure 5:
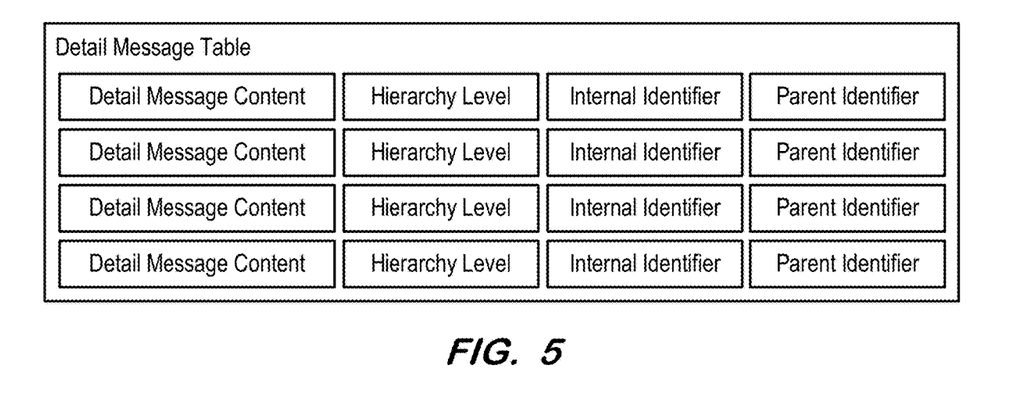
FIG. 5 is a representation of a stored detail message according to some embodiments.
Figure 6:
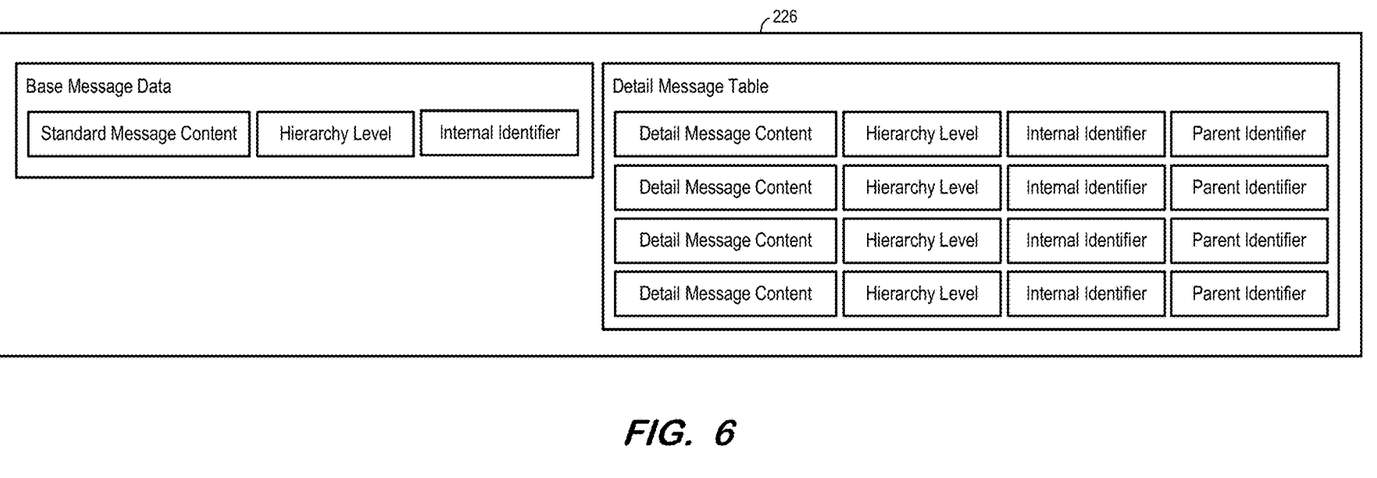
FIG. 6 is a representation of a stored base message and associated detail message according to some embodiments.

The ADD_MESSAGE method may provide import parameter data as shown in FIG. 3. The ObjectData indicates the object instance with which the message is associated. In some embodiments, a message which is added using the ADD_MESSAGE method and the import parameter data is stored in internal message buffer 226 in a table having the following structure:

| | |
| --- | --- |
| base_msg | TYPE cte_s_t100_msg |
| level | TYPE int4 |
| msg_ident | TYPE timestampl |
| deep_msg_tab | TYPE tt_msg_ref, | where base_msg includes the Standard Message Content and ObjectData of FIG. 3, level specifies a hierarchy level of the message, msg_ident is a unique identifier of the message, as shown in FIG. 4.

deep_msg_tab is a table including any "detail" (i.e., second-level) messages associated with the base message. As shown in FIG. 5, the table deep_msg_tab may exhibit the following structure in some embodiments:

| | |
| --- | --- |
| base_msg | TYPE cte_s_t100_msg |
| level | TYPE int4 |
| msg_ident | TYPE timestampl |
| parent_msg | TYPE timestampl, | where base_msg is the message content of the detail message, and parent_msg links the detail message to its parent via msg_ident of the base message. FIG. 6 illustrates a base message stored in buffer 226 along with a table including detail messages associated with the base message according to some embodiments. Buffer 226 may store more than one base message and zero or more detail messages associated with each stored base message according to some embodiments.

Figure 7:
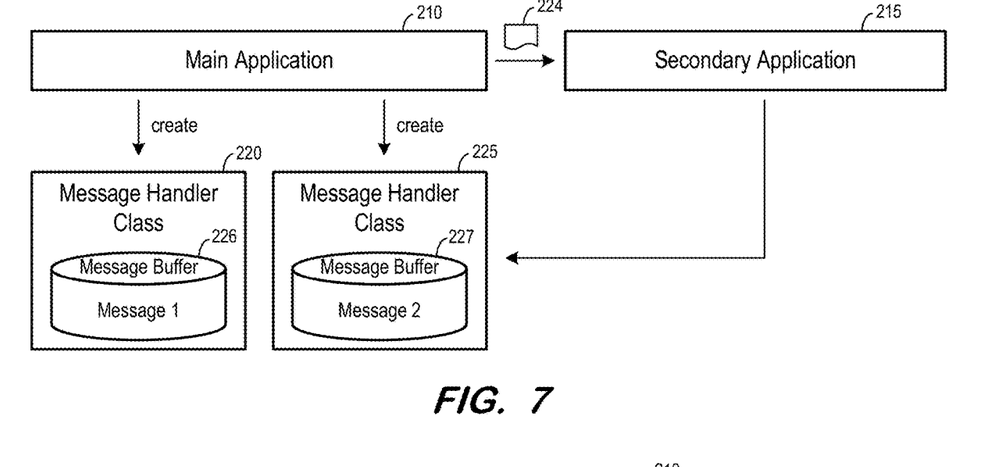
FIG. 7 illustrates creation of a secondary message handler class instance and handover and usage of a restricted interface according to some embodiments.

FIG. 7 illustrates usage of secondary interface 224 according to some embodiments. As shown, main application 210 has created message handler class instance 220 and added Message 1 to corresponding internal buffer 226. Main application 210 has also created message handler class instance 225.

Figure 8:
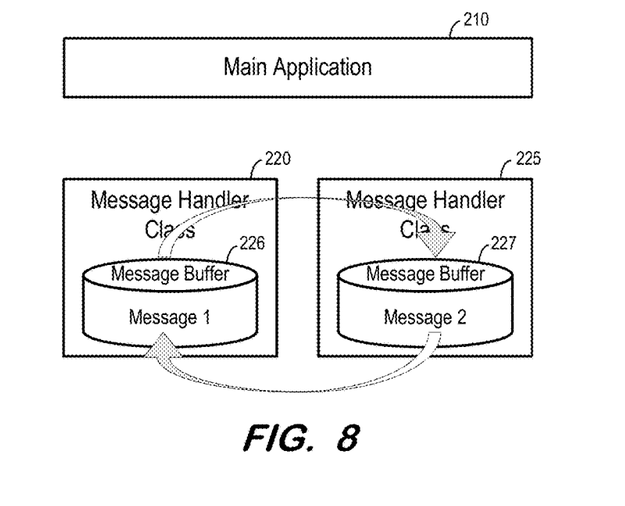
FIG. 8 illustrates takeover of a message of a message handler instance by another message handler instance according to some embodiments.
Figure 9:
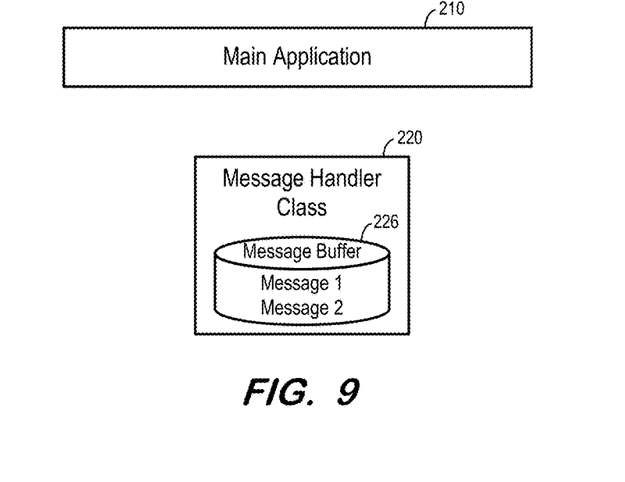
FIG. 9 illustrates a message handler instance including a buffer according to some embodiments.

Main application 210 hands secondary interface 224 to secondary application 215, along with a handle to message handler class instance 225. Secondary application 215 uses interface 224 and the handle to add Message 2 to corresponding message buffer 227. Next, as illustrated in FIG. 8, main application 210 invokes the TAKEOVER_MESSAGES method to retrieval Message 2 from message buffer 227 and, as shown in FIG. 9, store Message 2 in message buffer 226. According to some embodiments, Message 2 may be stored as a detail message associated with base Message 1.

Figure 10:
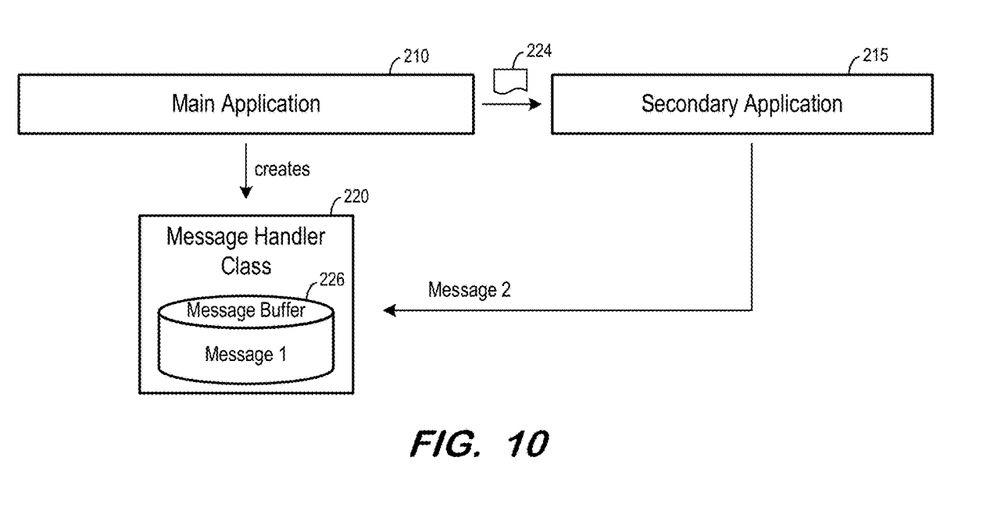
FIG. 10 illustrates handover and usage of a restricted interface according to some embodiments.
Figure 11:
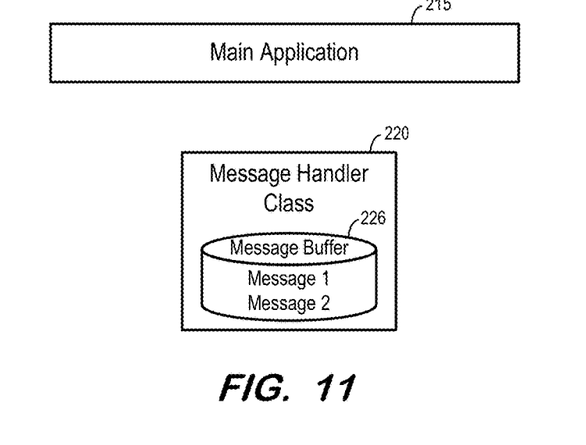
FIG. 11 illustrates a message handler instance including a buffer according to some embodiments.

Advantageously, secondary application 215 is not able to affect the contents of message buffer 226. FIG. 10 illustrates another, less restrictive embodiment in which main application 210 only creates message handler class instance 220, and hands secondary interface 224 to secondary application 215 along with a handle to instance 220. Accordingly, secondary application 215 may use interface 224 and the handle to add Message 2 directly to message buffer 226, as shown in FIG. 11.

Returning to FIG. 2, the interaction of message handler class 220 with logging tool 250 is encapsulated via standardized interface 245. Service factory 230 provides message handler class 220 with mediation class 240 implementing standardized interface 245 for the given logging tool 250. Different mediation classes 240 will implement standardized interface 245 for different logging tools 250. Accordingly, standardized interface 245 advantageously decouples message handler class 220 from the particular implementation of logging tool 250 such that message handler class 220 need not be aware of the particular implementation.

If an application wants to read or write messages from/into log persistency 260, message handler class 220 asks service factory 230 for mediation class 240 implementing standardized interface 245 for current logging tool 250. Service factory 230 instantiates the correct mediation class based on a configuration or other knowledge of its environment, and returns the interface to message handler class 220. According to some embodiments, standardized interface 245 includes the following methods:

| Method | Description |
| --- | --- |
| DELETE_LOG | Deletes a log having a given log ID |
| DISPLAY_MESSAGES_FROM_LOG | Displays message of a given log ID |
| GET_MESSAGES_FROM_LOG | Returns all messages of a given log ID |
| WRITE_MESSAGES_AS_LOG | Returns a lists of messages and stores the messages as a new log |

Figure 12:
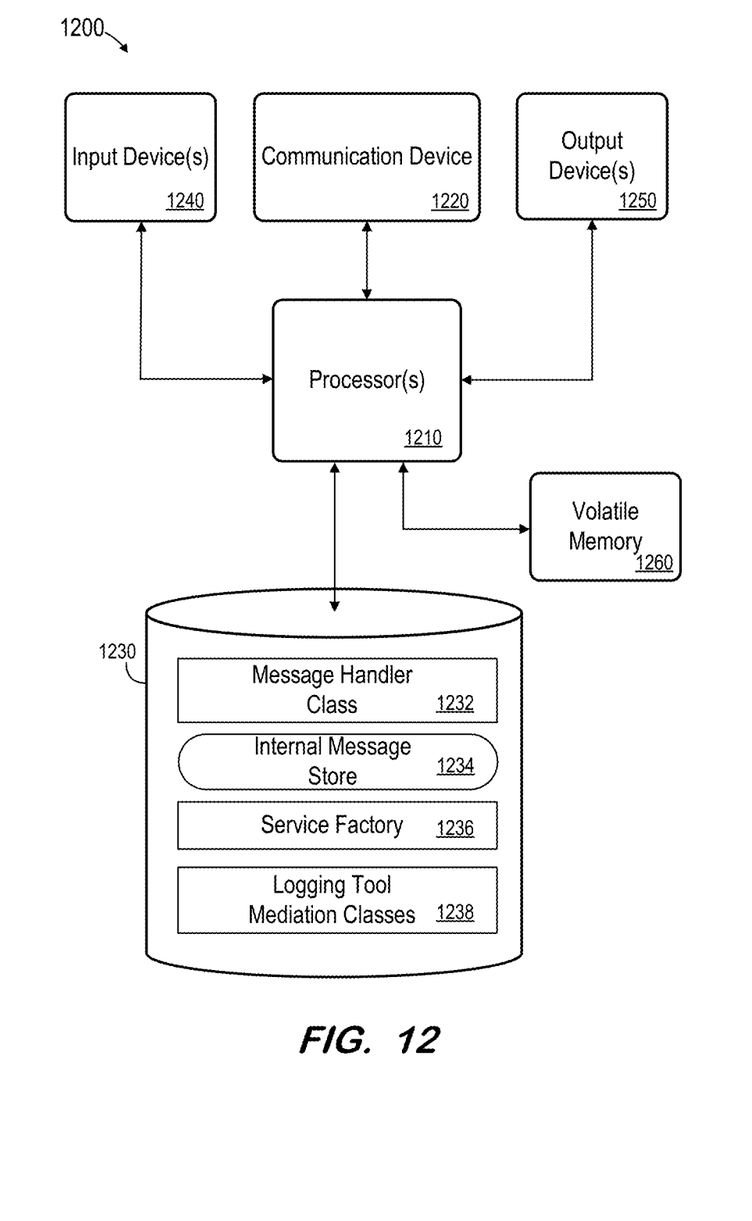
FIG. 12 is a block diagram of a computing system according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of data store 110 and server 120 of FIG. 1 in some embodiments. Apparatus 1200 may include other unshown elements according to some embodiments.

Apparatus 1200 includes processor(s) 1210 operatively coupled to communication device 1220, data storage device 1230, one or more input devices 1240, one or more output devices 1250 and volatile memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Message hander class 1232, service factory 1236 and logging tool mediation classes 1238 may comprise program code executed by processor 1210 to cause apparatus 1200 to perform any one or more of the processes described herein. Embodiments are not limited to execution of these processes by a single apparatus. Internal message store 1234 may include various memory areas, each of which may be allocated for association with an instance of message handler class 1232. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first server comprising a first memory and a first one or more processors, the first memory storing a first application comprising program code executable to cause the first server to:
      invoke a first method of a first interface to instantiate a first instance of a message handler class, the first instance of the message handler class storing a first message buffer, wherein the first message buffer stores a base message, and to instantiate a second instance of the message handler class; and
      provide a second interface to a second application comprising program code;
   a second server comprising a second memory and a second one or more processors, the second memory storing the second application comprising program code executable, with executable program code of the first application, to cause the second server to:
      invoke a second method of the second interface to add a first message to a second message buffer stored within the second instance of the message handler class, and subsequently transfer the first message from the second message buffer to the first message buffer stored within the first instance of the message handler class, wherein the base message and first message are interrelated messages having related message content;
   a data store;
   a logging server comprising a third memory and a third one or more processors, the third memory storing a first logging tool comprising program code executable to cause the logging server to expose a first logging interface and to store log data in the data store; and
   a third server comprising a fourth memory and a fourth one or more processors, the fourth memory storing a service factory comprising program code executable to cause the third server to instantiate a first mediation class, the first mediation class to expose a generic logging interface to the message handler class and to call the first logging interface based on calls to the generic logging interface.

2. A system according to claim 1, the first application comprising program code being further executable to cause the first server to:
   invoke the first method of the first interface to instantiate the second instance of the message handler class, the second instance of the message handler class associated with a second message buffer;
   invoke a third method of the first interface to add a third message to the second message buffer associated with the second instance of the message handler class; and
   invoke a fourth method of the first interface to acquire the second message from the first message buffer and to store the acquired second message in the second message buffer.

3. A system according to claim 1, wherein the subsequent transfer of the first message from the second message buffer to the first message buffer avoids the second application directly affecting the contents of the first message buffer.

4. A system comprising:
   a first one or more processors;
   a first application comprising program code executable to cause the system to:
      invoke a first method of a first interface to instantiate a first instance of a message handler class, the first instance of the message handler class storing a first message buffer, wherein the first message buffer stores a base message, and to instantiate a second instance of the message handler class; and
      provide a second interface to a second application comprising program code; and
   the second application comprising program code executable to cause the system to:
      invoke a second method of the second interface to add a first message to a second message buffer stored within the second instance of the message handler class, and subsequently transfer the first message from the second message buffer to the first message buffer stored within with the first instance of the message handler class, wherein the base message and first message are interrelated messages having related message content.

5. A system according to claim 4, the first application comprising program code being further executable to cause the system to:
   invoke a third method of the first interface to add the base message to the first message buffer associated with the first instance of the message handler class.

6. A system according to claim 5, wherein the first message is a detail message, the first message is stored in association with an identifier of the base message, and the base message is associated with a first level of a hierarchy and the first message is associated with a second level of the hierarchy.

7. A system according to claim 4, the first application comprising program code being further executable to cause the system to:
   invoke the first method of the first interface to instantiate the second instance of the message handler class, the second instance of the message handler class associated with a second message buffer; and
   invoke a third method of the first interface to add a third message to the second message buffer associated with the second instance of the message handler class.

8. A system according to claim 7, the first application comprising program code being further executable to cause the system to:
   invoke a fourth method of the first interface to acquire the first message from the second message buffer and to store the acquired first message in the first message buffer.

9. A system according to claim 8, wherein the first message is a detail message, the first message is stored in association with an identifier of the base message, and the base message is associated with a first level of a hierarchy and the first message is associated with a second level of the hierarchy.

10. A system according to claim 4, wherein the second interface comprises a subset of the methods of the first interface.

11. A system according to claim 4, further comprising:
    a first logging tool comprising program code executable to cause the system to expose a first logging interface and to store log data in a data store; and
    a service factory comprising program code executable to cause the system to instantiate a given first mediation class based on a service factory knowledge of an environment, the first mediation class to expose a generic logging interface to the message handler class and to call the first logging interface based on calls to the generic logging interface.

12. A system according to claim 11, further comprising:
a second logging tool comprising program code executable to cause the system to expose a second logging interface and to store log data in the data store,
wherein the service factory comprising program code is further executable to cause the system to instantiate a second mediation class, the second mediation class to expose the generic logging interface to the message handler class and to call the second logging interface based on calls to the generic logging interface.

13. A computer-implemented method comprising:
invoking, from a first application, a first method of a first interface to instantiate a first instance of a message handler class, the first instance of the message handler class storing a first message buffer, wherein the first message buffer stores a base message, and to instantiate a second instance of the message handler class;
providing, from the first application, a second interface to a second application; and
invoking, from the second application, a second method of the second interface to add a first message to a second message buffer stored within the second instance of the message handler class, and subsequently transfer the first message from the second message buffer to the first message buffer stored within the first instance of the message handler class, wherein the base message and first message are interrelated messages having related message content.

14. A method according to claim 13, further comprising:
invoking a third method of the first interface to add the base message to the first message buffer associated with the first instance of the message handler class.

15. A method according to claim 14, wherein the first message is a detail message, the first message is stored in association with an identifier of the base message, and the base message is associated with a first level of a hierarchy and the first message is associated with a second level of the hierarchy.

16. A method according to claim 13, further comprising:
invoking, from the first application, the first method of the first interface to instantiate the second instance of the message handler class, the second instance of the message handler class associated with a second message buffer; and
invoking, from the first application, a third method of the first interface to add a third message to the second message buffer associated with the second instance of the message handler class.

17. A method according to claim 16, further comprising:
invoking, from the first application, a fourth method of the first interface to acquire the first message from the second message buffer and to store the acquired first message in the first message buffer.

18. A method according to claim 17, wherein the first message is detail message, the first message is stored in association with an identifier of the base message, and the base message is associated with a first level of a hierarchy and the first message is associated with a second level of the hierarchy.

19. A method according to claim 13, further comprising:
exposing, at a first logging tool, a first logging interface to store log data in a data store; and
instantiating a first mediation class at a service factory, the first mediation class to expose a generic logging interface to the message handler class and to call the first logging interface based on calls to the generic logging interface.

20. A method according to claim 19, further comprising:
exposing, at a second logging tool, a second logging interface to store log data in the data store,
wherein the service factory is executable to instantiate a second mediation class, the second mediation class to expose the generic logging interface to the message handler class and to call the second logging interface based on calls to the generic logging interface.

* * * * *